United States Patent [19]
Gunder et al.

[11] Patent Number: 5,938,174
[45] Date of Patent: Aug. 17, 1999

[54] GATE VALVE ACTUATOR

[75] Inventors: James A. Gunder, Taylor, Mich.;
William T. Brockington, Kernersville, N.C.

[73] Assignee: CAMCO Manufacturing, Inc., Greensboro, N.C.

[21] Appl. No.: 09/082,695

[22] Filed: May 21, 1998

Related U.S. Application Data

[63] Continuation-in-part of application No. 08/892,036, Jul. 14, 1997, Pat. No. 5,855,359.

[51] Int. Cl.⁶ ...................................................... F16K 3/02
[52] U.S. Cl. ............................................. 251/326; 251/279
[58] Field of Search ..................................... 251/239, 279, 251/326; 74/20, 46

[56] References Cited

U.S. PATENT DOCUMENTS

| | | |
|---|---|---|
| 1,801,237 | 4/1931 | Hanson . |
| 2,701,117 | 2/1955 | Bashark . |
| 2,853,269 | 9/1958 | Shand . |
| 3,316,929 | 5/1967 | Milette ................................... 137/270 |
| 3,941,349 | 3/1976 | Pierson .................................... 251/100 |
| 4,875,504 | 10/1989 | Nicholson .............................. 137/899 |
| 5,078,180 | 1/1992 | Collins ................................... 137/899 |
| 5,281,049 | 1/1994 | Holt .......................................... 454/69 |
| 5,445,190 | 8/1995 | Gunder .................................... 137/899 |
| 5,855,357 | 1/1999 | Gunder .................................... 251/326 |

*Primary Examiner*—John Fox

[57] ABSTRACT

A manual actuator is attached to a conventional gate valve commonly used in the drainage line of a recreational vehicle. The actuator includes a handle which turns through an arcuate slot moving a link member around the slot in such a manner as to open or close the valve. Additionally, in the alternate embodiment, the handle defines a recess adapted to receive a tire iron or other suitable tool having an edge approximately 1.27 cm across for greater leverage and the handle is also adapted to allow the use of the gate valve actuator with differently sized gate valves.

16 Claims, 8 Drawing Sheets

GATE VALVE ACTUATOR

This is a continuation-in-part of patent application Ser. No. 08/892,036 filed Jul. 14, 1997, now U.S. Pat. No. 5,855,359.

BACKGROUND OF THE INVENTION

1. Field of the Invention

The invention herein pertains to a gate valve actuator and particularly to an actuator for manually opening the gate valve on a drainage pipe of a recreational vehicle (RV).

2. Description of The Prior Art And Objectives Of The Invention

Manual gate valve actuators such as in U.S. Pat. No. 5,455,190 are standard, but are cumbersome to build and difficult to attach properly to drainage pipes on RV's. Also, under adverse conditions the linkages may bind, or fail to operate properly. In prior devices with multiple links connecting the support member to the valve stem, it has been difficult to hold each link in place as the coupling was connected to the valve stem. Parts could tarnish or corrode, making movement between such parts difficult and uneven. Likewise, standard manual gate valve actuators utilized many components and manufacturing steps.

Additionally, gate valve actuators are frequently only capable of being used with one size of gate valve (typically a three inch gate valve). A further problem with most conventional gate valves is that individuals with little hand strength may find it difficult to turn the gate valve actuator handle without assistance.

Thus, with the problems associated with prior art gate valve actuators, the present invention was conceived and it is an object herein to provide an improved actuator which eliminates the need for excess couplings for attachment to the gate valve.

It is a further object of this invention to create an actuator from molded plastic requiring fewer manufacturing steps.

It is another object of this invention to make a gate valve actuator which is relatively low in cost to produce so that such savings may be passed on to the consumer.

It is a further object of this invention to make a gate valve actuator which has a smooth action so that relatively little manual strength is required to open a gate valve.

It is still a further object of this invention to make a gate valve actuator which is long lasting despite the harsh road and weather conditions to which it may be exposed.

It is another objective to provide a gate valve actuator which is adapted to fit on differently sized gate valves.

It is yet another objective to provide a gate valve actuator which can be used with a conventional tire iron for additional leverage.

Additional objects and advantages of the invention will become apparent as a more detailed analysis of the illustrations is undertaken below.

SUMMARY OF THE INVENTION

This invention provides a gate valve actuator for mounting on a standard manual gate valve housing. The actuator includes a handle which moves an axle along an arcuate slot in a support member. The axle is connected to a link member which directs the valve stem of the gate valve inwardly or outwardly as selected to thereby open or close the gate valve. The arcuate slot is formed in a smooth rigid plastic support member which promotes easy movement and prevents sticking or "freezing" of the actuator.

An alternate embodiment of the present invention is substantially identical to that described above, but the handle defines a recess in the center thereof. The recess is preferably generally square and sized to receive a device such as a tire iron or other suitable lever tool so that a user may exert leveraged force on the actuator in order to manipulate the same. On the reverse side of the handle, the handle defines a plurality of connection points at various radial distances from the center of the handle. These differently spaced connection points allow one gate valve actuator to be used on a number of different conventional gate valves.

DETAILED DESCRIPTION OF THE PREFERRED EMBODIMENT AND OPERATION OF THE INVENTION

Figures 1, 4:
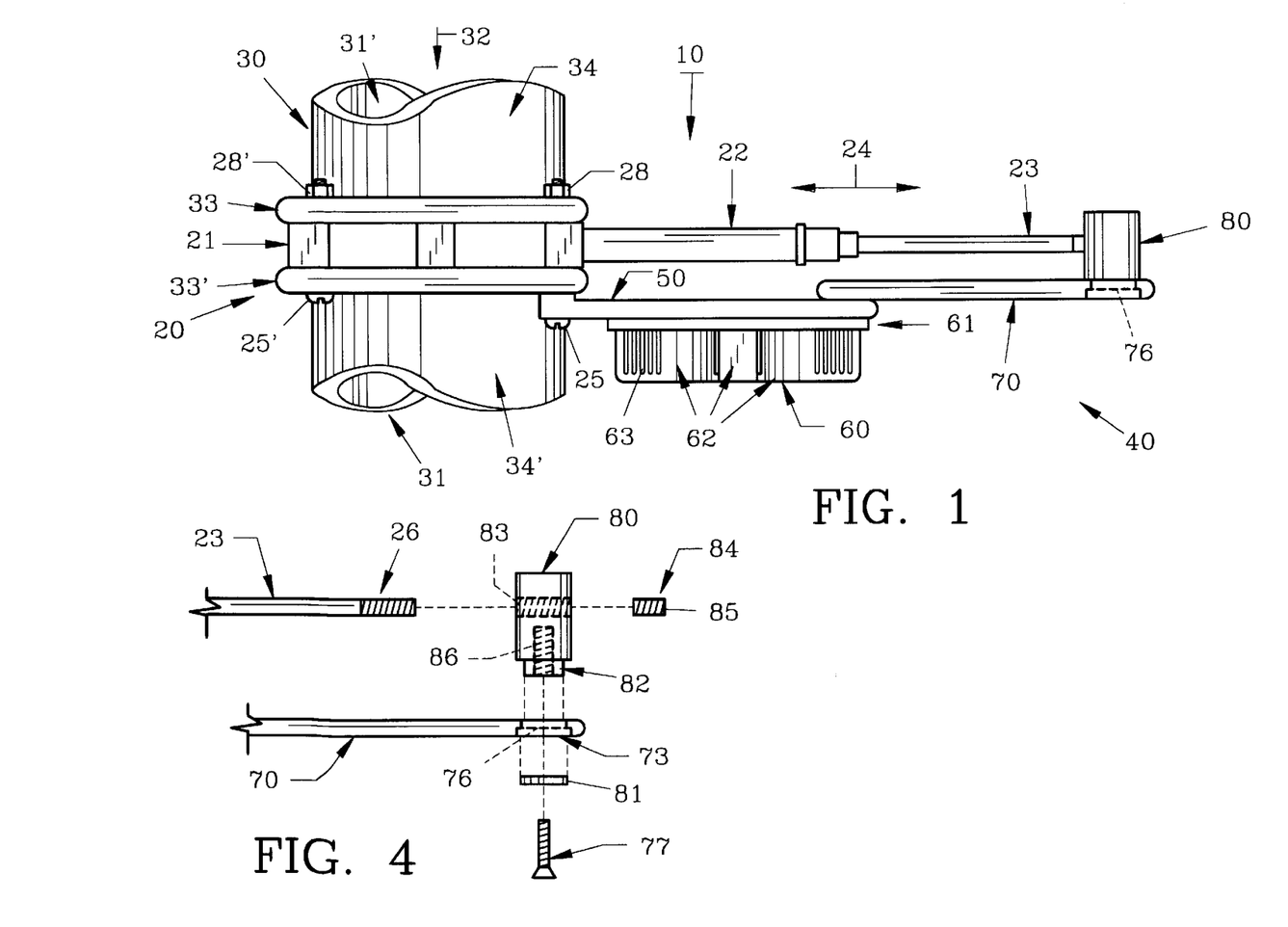
FIG. 1 shows the preferred form of the gate valve actuator in an open posture attached to the gate valve housing in a top view.
FIG. 4 features the coupling, fragmented link member and fragmented valve stem in exploded fashion for clarity.

Turning now to the drawings, FIG. 1 shows composite assembly 10 of a commercially available gate valve 20 positioned on drain conduit 30 and preferred gate valve actuator 40. Gate valve 20 is connected to drain conduit 30 of a typical recreational vehicle (not shown) as is standard. It is understood that drain conduit 30 has openings 31, 31' in sections 34, 34' respectively and would be joined to a RV waste storage tank (not shown) on the distal end of 34 (not shown) and to an exterior drain line (not shown) on the distal end of 34' (not shown) as is conventional. Housing 21 of gate valve 20 mounts between flanges 33 and 33' of drain conduit sections 34 and 34' respectively. Gate valve 20 has a slidable gate (not shown), located in gate valve 20 and between flanges 33 and 33' which can be opened and closed. When the gate is opened, waste products flow through conduit 30 in a direction of flow as indicated by arrow 32. Housing 21 normally features valve body 22 and valve stem 23 which moves laterally as indicated by arrow 24. When valve stem 23 is pushed into valve body 22, the gate (not shown) within drain conduit 30 closes and waste will no longer flow through drain conduit 30. When valve stem 23 is extended, gate valve 20 is opened permitting the waste to flow out drain conduit 30 as is well known, to a sewer line, treatment plant or other facility.

When gate valve actuator 40 is not in place on conduit 30, gate valve 20 is sandwiched between flanges 33 and 33' and connected thereto by short bolts 25' and nuts 28' (only one set of which is seen in FIG. 1). Gate valve actuator 40 is attached to flange 33' by fastening means such as screws or bolts 25 and nuts 28, while gate valve 20 remains sandwiched between flanges 33 and 33'. As would be understood, only top bolts 25, 25' and nuts 28, 28' are seen in FIG. 1, but each has a corresponding set of lower nuts 28, 28' and bolts 25, 25' passing through the bottom of flanges 33, 33' as is conventional.

Typically, gate valve actuator 40 is mounted on drain conduit 30, but spaced therefrom by flanges 33 and 33', and extends therefrom in the same direction as valve body 22 as seen in FIG. 1. Gate valve actuator 40 comprises planar support member 50 with handle 60. Handle 60 includes circular handle plate 61 with four fingers 62 disposed thereon (FIG. 2) and rotates about an axis perpendicular to support member and parallel to arrow 32. Fingers 62 are integrally formed with circular handle plate 61 for gripping purposes. Finger ridges 63 are molded on each side of each of fingers 62 to provide friction while gripping. Link member 70 is attached to support member 50 as will be discussed below in more detail. Cylindrical coupling 80 is attached to link member 70 and pivotally connects link member 70 to valve stem 23. In the open position, link member 70 extends in the same direction as support member 50 and beyond so that valve stem 23 is fully extended.

Figure 2:
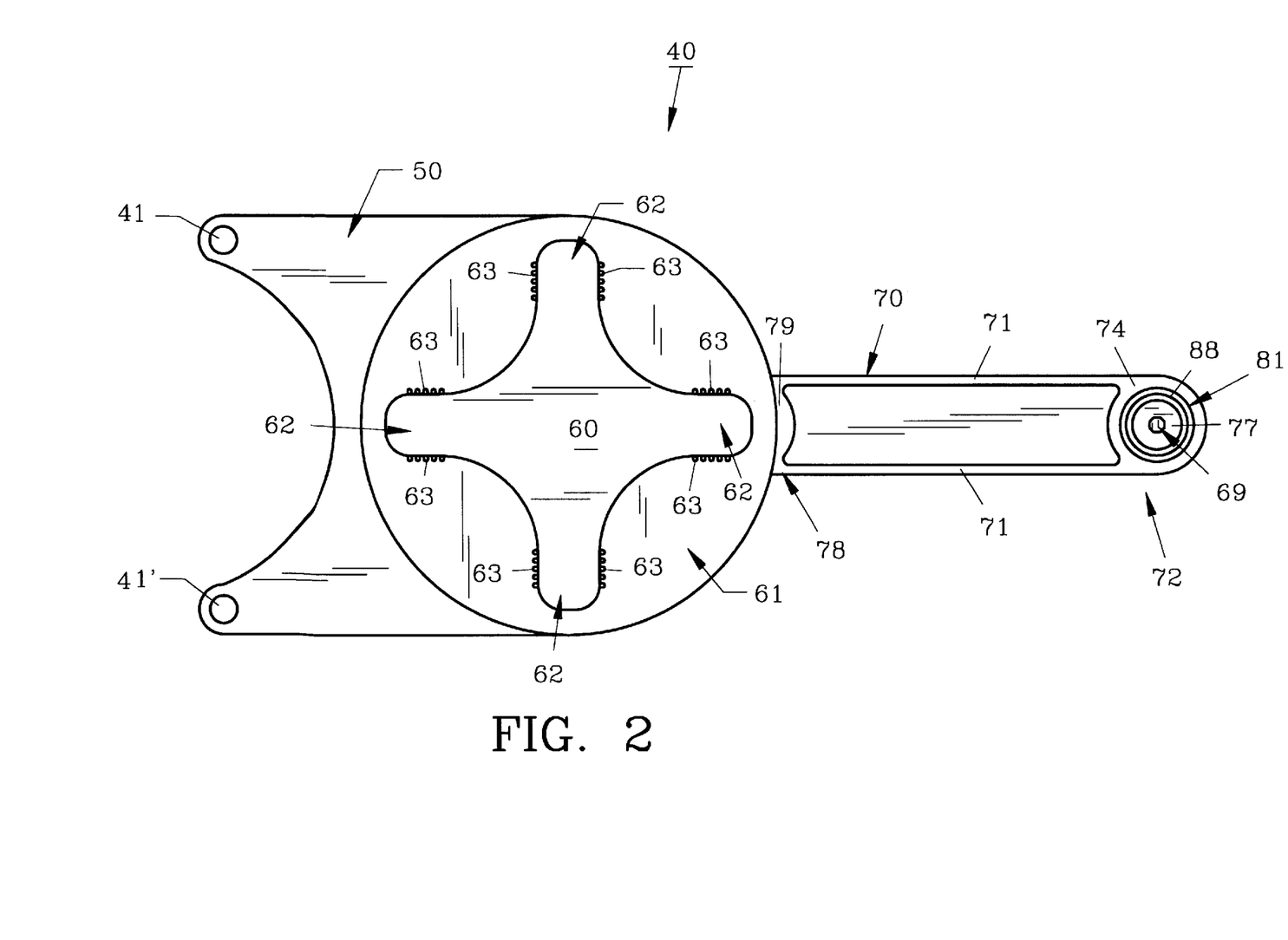
FIG. 2 depicts the front of the gate valve actuator of FIG. 1 as removed from the gate valve, and in an open posture.
Figures 2A, 5:
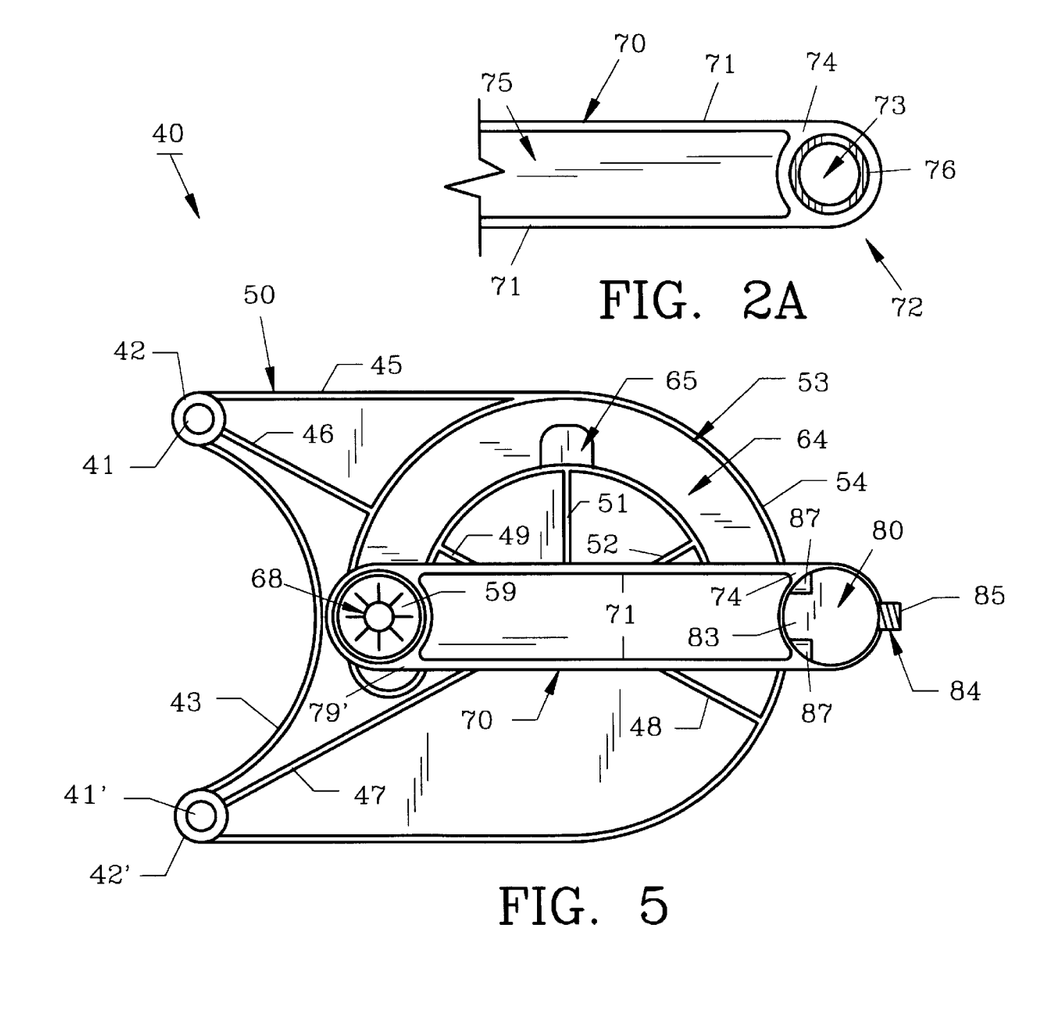
FIG. 2A pictures the link member of the gate valve actuator in fragmented form with the coupling removed.
FIG. 5 shows the back of the gate valve actuator as seen in FIG. 3, but in a closed posture.

As seen in FIG. 2A link member 70 is an elongated plastic member with reinforcing ridges 71 along its outer edges. Link member 70 has a terminal end 72 defining a circular hole 73 therein surrounded by ridge 74. In the preferred embodiment ridge 71 and ridge 74 extend approximately 0.32 cm from planar surface 75. Shoulder 76 within hole 73 is designed to support nylon washer 81 (FIG. 4) to prevent nylon washer 81 from passing through hole 73, which is sized to receive nipple 82 of coupling 80.

Figures 3, 3A:
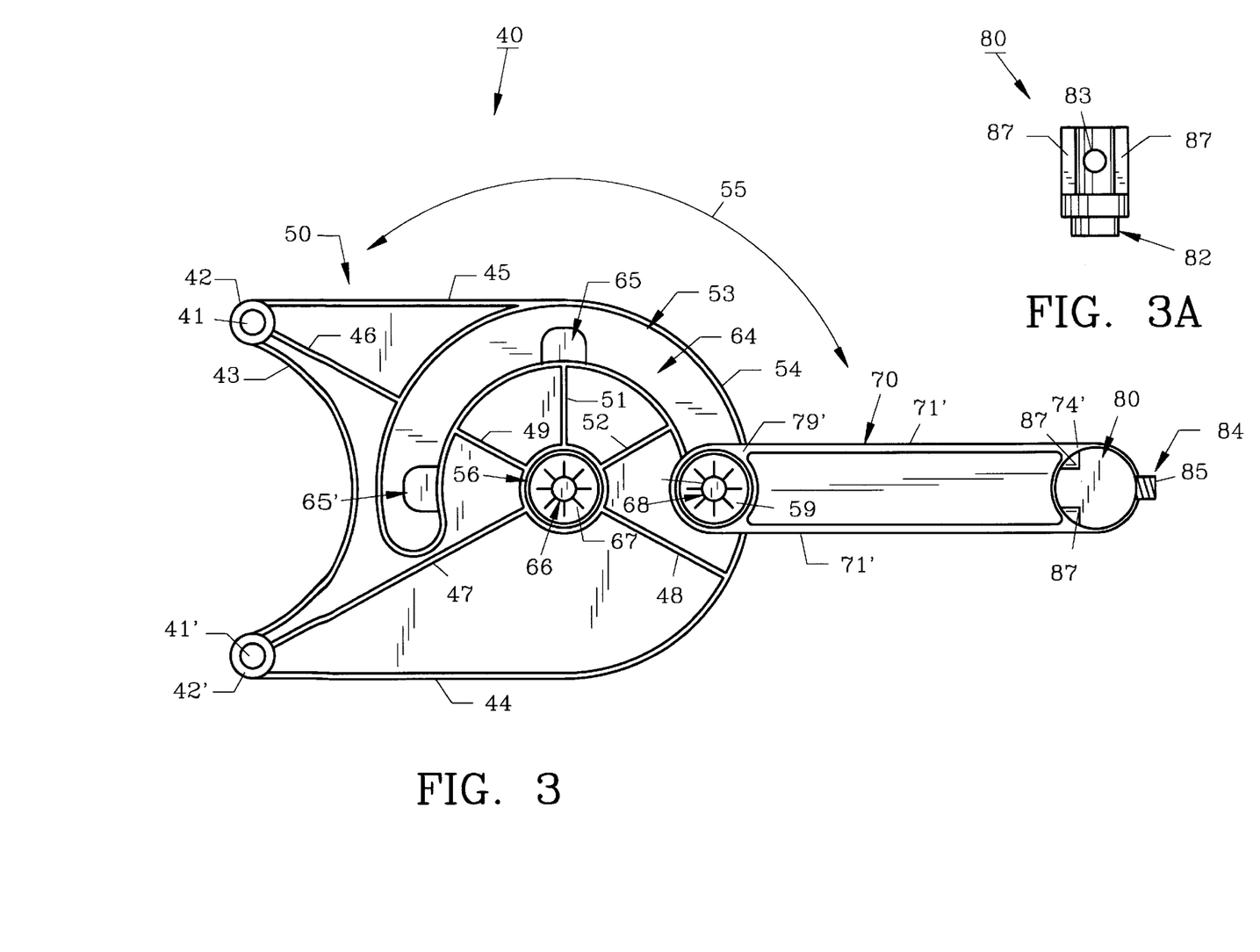
FIG. 3 illustrates the back of the gate valve actuator as seen in FIG. 2.
FIG. 3A demonstrates the coupling as removed from the link member.

As further seen in FIG. 4, valve stem 23 is attached to link member 70 by coupling 80. Coupling 80 has radial interiorly threaded channel 83 adapted to receive threaded terminal end 26 of valve stem 23. Threaded setscrew 84 is designed to thread within channel 83. Thus, threaded end 26 of valve stem 23 enters one end of threaded channel 83 and setscrew 84 "caps" threaded end 26. Setscrew 84 includes end 85 which is adapted to be turned by an Allen wrench (not shown). Thus, setscrew 84 can be tightened against valve stem 23 within channel 83. Coupling 80 includes nipple 82 which is designed to fit hole 73 of link member 70. Nylon washer 81 rests on shoulder 76 within link member 70 while threaded capscrew 77 passes through nylon washer 81 and threads into channel 86 of coupling 80. In FIG. 3A coupling 80 includes exterior shoulders 87 to facilitate manual manipulation of coupling 80 as it is threaded onto valve stem 23.

FIG. 2 provides a front view of gate valve actuator 40 and illustrates several previously obscured features. Holes 41 and 41' are designed to receive bolts 25 (FIG. 1) to attach support member 50 to flange 33'. This view also shows four radial fingers 62 of handle 60. Likewise, the placement of finger ridges 63 can be seen on each finger 62. Link member 70 includes proximate end 78 which has ridge 79 comparable to ridge 74 on terminal end 72. Capscrew 77 is fitted into nylon washer 81. Recess 69 on the flat end of capscrew 77 is adapted to receive an Allen wrench or similar screw tightening device (not shown) so that capscrew 77 can be tightened into channel 86 (FIG. 4) of coupling 80. Nylon washer 81 has peripheral ridge 88 which is interiorly tapered to receive capscrew 77. This arrangement allows coupling 80 to pivotally attach link member 70 to valve stem 23.

In FIG. 3 the back of the preferred embodiment of gate valve actuator 40 is in the open position. Surrounding holes 41 and 41' are respectively ridges 42 and 42'. Arcuate ridge 43 which extends from ridge 42 to ridge 42' is designed to strengthen support member 50 and is of sufficient radius to circumscribe drain conduit 30 (FIG. 1), although arcuate ridge 43 (FIG. 3) is spaced therefrom by flange 33'. Lower outer ridge 44 is likewise designed to strengthen support member 50 as is upper outer ridge 45. Interior ribs 46, 47, 48, 49, 51, and 52 are of similar height to ridges 44 and 45 and all are integrally formed with support member 50. Ribs 46, 47, 48, 49, 51 and 52 are designed to prevent support member 50 from flexing during use.

Axle 66 is integrally formed with handle plate 61 and extends through a first opening 56 in support member 50, which, as seen, is spaced from a second opening embodied by arcuate slot 53. Fastener 67 which is a plastic locking washer holds axle 66 in place, but allows axle 66 to rotate relative to support member 50. Back side 64 of circular handle plate 61 can be seen through arcuate slot 53. Depressions 65 and 65' depict the inside of hollow fingers 62 of handle 60. Axle 68 is integrally formed with handle plate 61 and extends through arcuate slot 53 and through link member 70. Fastener 59 holds axle 68 in place, but allows link member 70 to rotate around axle 68. The back of link member 70 includes ridges 71' along its edges and circular ridges 74' and 79' at each end. Arcuate slot 53 includes arcuate ridge 54 along its outer edge. Arcuate ridge 54 is of similar height to ridges 44 and 45 and extends from support member 50. Link member 70 rides in contact with ridge 54 as handle 60 is turned, thereby moving axle 68 through arcuate slot 53 in a manner generally indicated by arrow 55, while link member 70 allows valve stem 23 to move in a linear motion. Axle 68 is never touched by arcuate ridge 54 because axle 68 is integrally formed with handle plate 61 and moves as in the arcuate manner of arrow 55 because of its positioning on circular handle plate 61. It is within the scope of the present inventions to have openings of different shapes than arcuate slot 53, such as a semicircular opening or a rectangular opening, but in the preferred embodiment, arcuate slot 53 is used to provide more rigidity to support member 50.

The preferred embodiment of gate valve actuator 40 is shown in FIG. 5 in the closed position after handle 60 has been rotated from its position as seen in FIG. 3. Axle 68 has moved through arcuate slot 53 and has pivotally moved link member 70 to its present position. At the same time coupling 80 has pivoted relative to link member 70 in such a manner that valve stem 23 (not shown in FIG. 5) has moved inwardly in a linear fashion, thereby closing gate valve 20 (not shown in FIG. 5).

Figure 6:
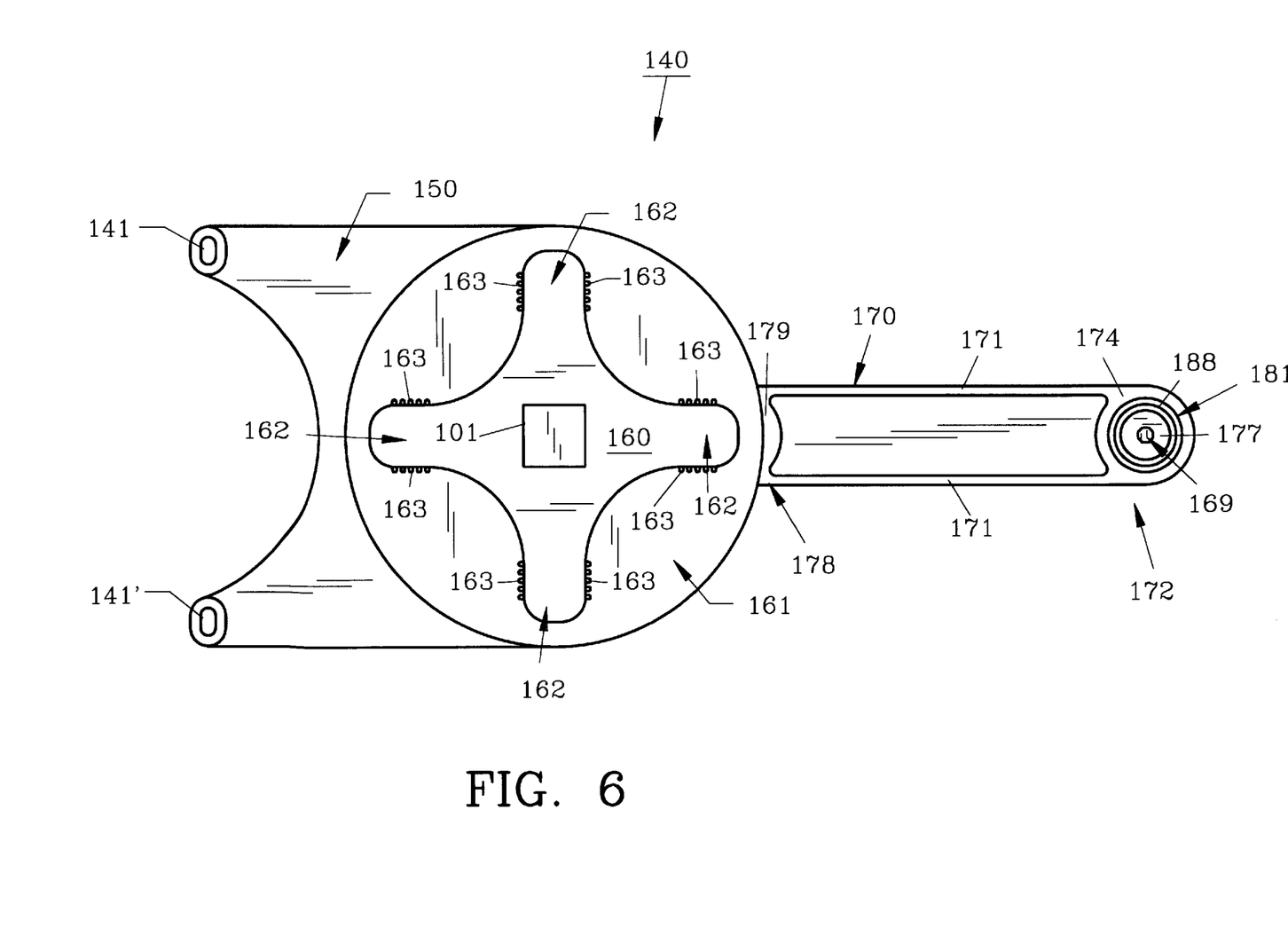
FIG. 6 illustrates the front of an alternate gate valve actuator removed from the gate valve, and in an open posture.
Figure 7:
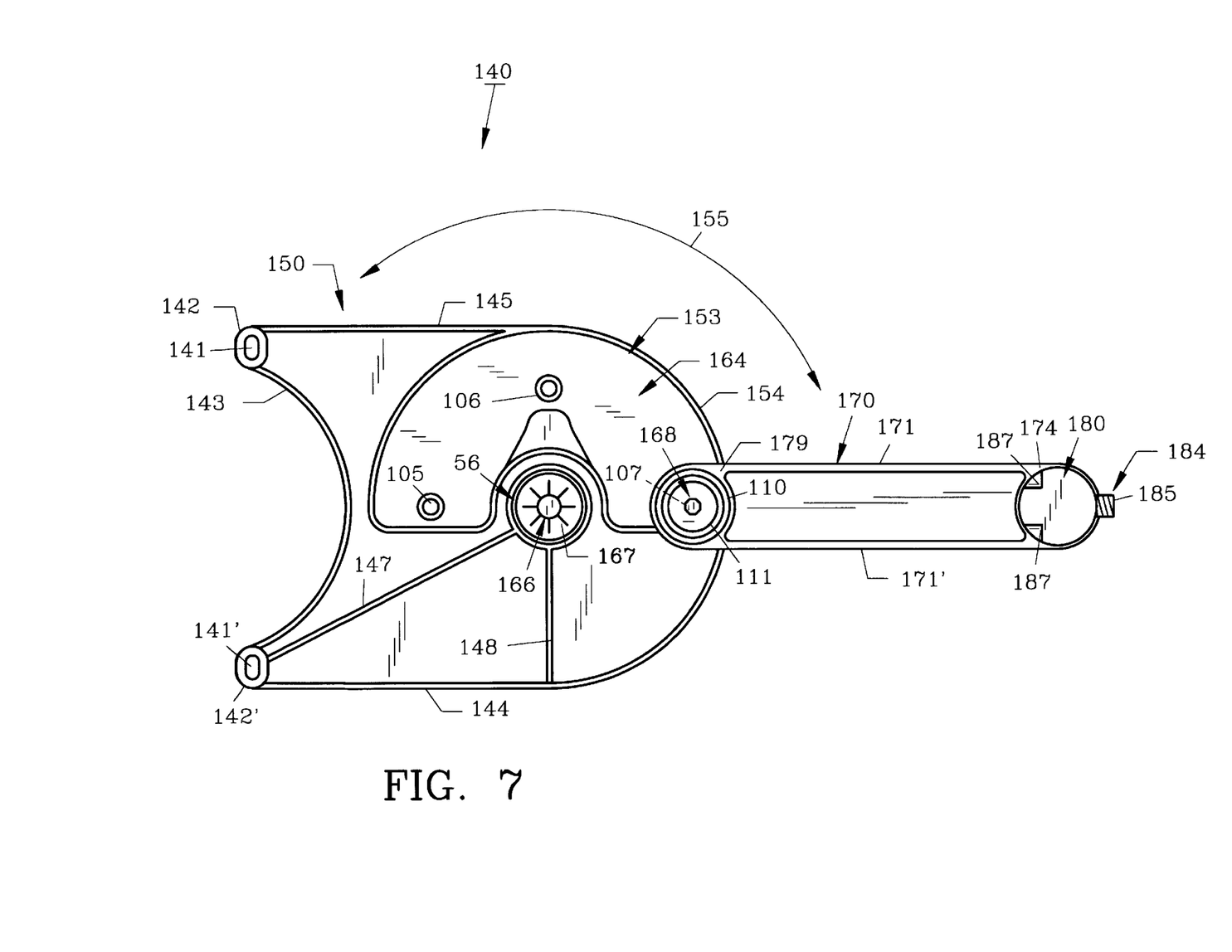
FIG. 7 depicts the back of the gate valve actuator as seen in FIG. 6.
Figure 8:
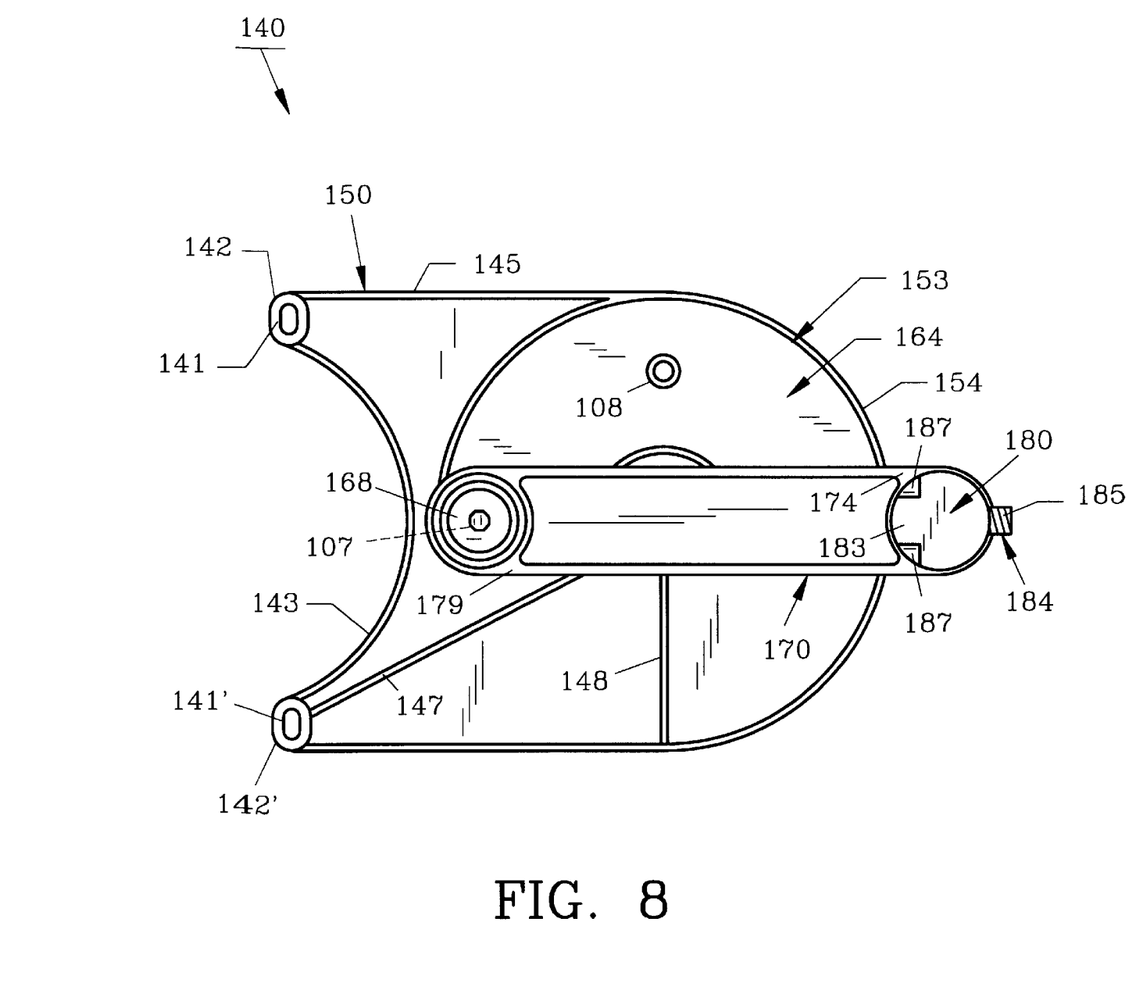
FIG. 8 demonstrates the back of the gate valve actuator as seen in FIG. 6, but in a closed posture.
Figure 9:
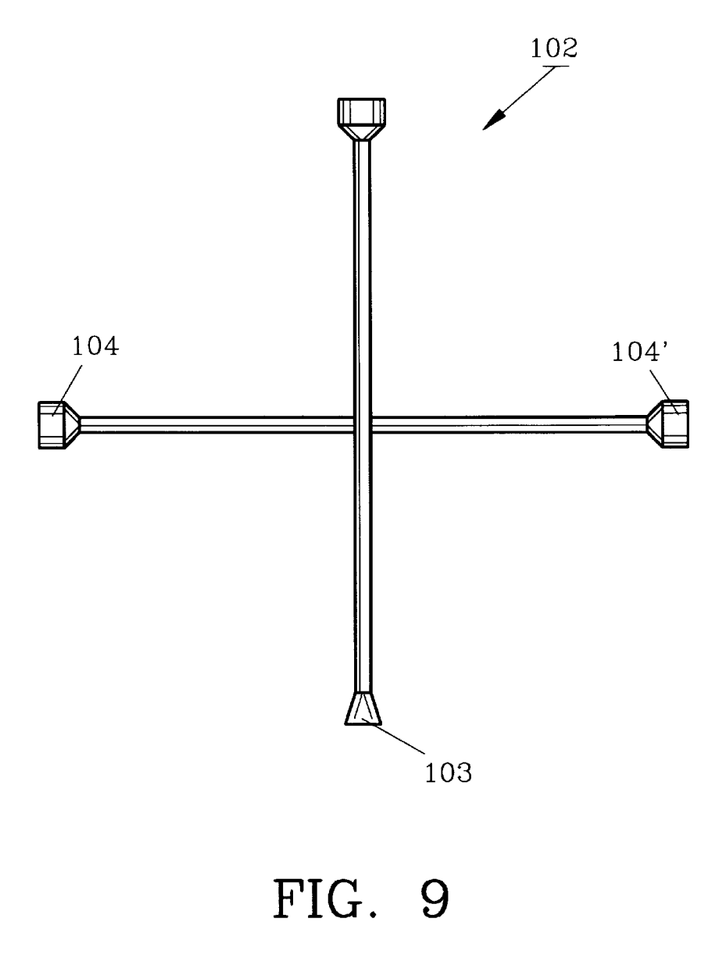
FIG. 9 features a conventional tire iron for use with the gate valve actuator of FIG. 6.

Alternate gate valve actuator 140 is seen in FIGS. 6–8. Gate valve actuator 140 is substantially identical to gate valve actuator 40, but includes certain refinements. Similar parts are labeled by adding 100 to the numerical designator. Thus handle 60 of gate valve actuator 40 becomes handle 160 of gate valve actuator 140. In FIG. 6, handle 160 defines recess 101 in the center thereof. Recess 101 is preferably square and about one half inch (1.27 cm) along each side, while forming a depression therein slightly deeper than 1.27 cm. Recess 101 is designed to receive a lever such as operative end 103 of conventional tire iron 102 (FIG. 9) or the like. Suitable levers include any tool having no more than a 1.27 cm×1.27 cm square section at the terminal end, although screwdrivers or the like could also be used even though they have a terminal end corresponding to roughly 1.27 cm×0.1 cm as long as it operatively engaged recess 101. After insertion of operative end 103 into recess 101 ends 104, 104' may be manually grasped to turn handle 160 of gate valve actuator 140. In this manner, more force may be applied to handle 160 than would otherwise be possible.

Another difference between gate valve actuator 40 and alternate actuator 140 is that holes 141, 141' (FIGS. 6 and 7) are elongated ovals rather than circular. This allows some adjustability on the positioning of actuator 140 on the gate valve, such as gate valve 20, thereby allowing actuator 140 to fit on differently sized gate valves.

Turning now to FIGS. 7 and 8, the back of gate valve actuator 140 is seen. Arcuate slot 153 has been sized so that it is substantially wider than slot 53 thereby exposing more of back side 164 of handle 160. Connection points 105–108 are positioned, one each, on fingers 162 in place of depressions 65, 65' (FIG. 3). Connection points 105–108 are preferably threaded apertures and each can receive modified connector 168. Unlike actuator 40, which includes integral axle 68, actuator 140 includes a selectively positionable connector 168, which will be explained in greater detail below. Each connection point 105–108 is positioned at a different radial length from the center of handle 160. Since slot 153 is wider than slot 53, a range of positions is possible. If the length of link member 170 is varied and modified connector 168 is properly positioned, gate valve actuator 140 works well with one and one half inch (3.81 cm) or two inch (5.08 cm) gate valves. While ideally gate valves would be uniform, certain proprietary gate valves would require special positioning of connection points 105–108.

Figure 10:
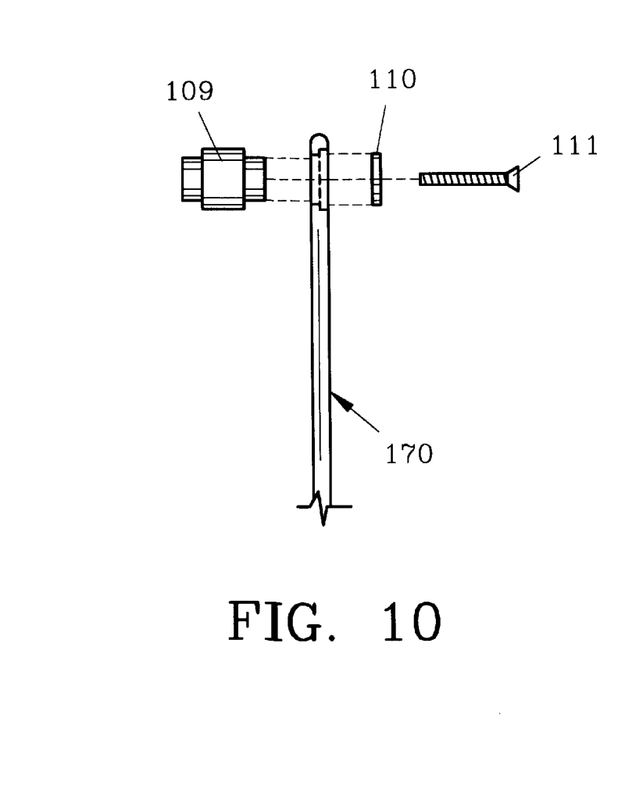
FIG. 10 shows an exploded view of the modified connector of the gate valve of FIG. 6.

Modified connector 168 in FIG. 10 comprises axle 109, nylon washer 110 and threaded fastener 111. Nylon washer 110 is identical to washer 81 and fastener 111 is preferably identical to capscrew 77. Axle 109 is preferably an annular cylindrical elongated member sufficiently long enough so that link member 170 rides on ridge 154. Fastener 111 is preferably threaded and may be positioned in any of connection points 105–108. It should be understood that fastener 111 must be longer than axle 109 to thread into connection points 105–108. Axle 109 is free to pivot relative to both handle 160 and link member 170 while fastener extends through the channel defined by the annular axle.

Additional minor changes in the reinforcing ridges such as ridges 147 and 148 are also performed to accommodate larger slot 153, but the ridges perform the same function and are generally similar to ridges 47 and 48.

Thus, with alternate embodiment gate valve actuator 140, handle 160 is well suited for use with a lever aid such as tire iron 102, allowing individuals of little hand or harm strength to still manipulate gate valve actuator 140 and thus open gate valve 20. Additionally, gate valve actuator 140 can be used easily on differently sized gate valves and can be used with conventional proprietary gate valves without having to purchase a new gate valve actuator.

A preferred method of using gate valve actuator 40 comprises installing gate valve actuator 40 on gate valve 20. Gate valve 20 is maintained in its closed position while the recreational vehicle travels or when the users do not desire to empty the waste tanks of the recreational vehicle. When the user does desire to empty the waste tanks of the recreational vehicle, the user manually grasps handle 60 by fingers 62 and turns handle 60. Handle 60 drags axle 66 around arcuate slot 53 thereby moving link member 70 away from gate valve 20. This urges valve stem 23 outwardly, thereby opening the gate within gate valve 20 and allowing waste to flow through conduit 30 to a suitable disposal site. Once the waste tanks are empty, the user then turns handle 60 in the reverse direction, thereby dragging axle 66 back around slot 53, moving link member 70 towards gate valve 20 and urging valve stem 23 inwardly to close the gate of gate valve 20.

Alternately, instead of manually turning handle 60, the user may insert operative end 103 of tire iron 102 into recess 101 of handle 160. The user may then grasp ends 104, 104' in either hand and turn tire iron 102 exerting leveraged force on handle 160 and turning the same to complete the actions described above.

Finally, during the installation procedure, gate valve actuator 140 may be used instead of gate valve actuator 40, and it may be positioned on a number of differently sized gate valves through the repositioning of link member 170 and modified connector 168 in connection points 105–108.

The preceding recitation is provided as an example of the preferred embodiment and is not meant to limit the nature or scope of the present invention. As would be expected, alternative materials such as metal could be used, but are not preferred. Likewise mere changes in shape are clearly contemplated for particular configurations and gate valves encountered.

We claim:

1. An external actuator for manually operating a gate valve, said gate valve having a housing and a linearly sliding gate in the housing movable between open and closed positions, and an elongated valve stem attached to the gate valve to slide in a reciprocal path of motion along the longitudinal axis of the valve stem, the actuator comprising:

a support member, said support member extending along and spaced from the valve stem, the valve stem exteriorly positioned of said support member, said support member defining a first opening and a second opening;

means for fastening the support member to the gate valve housing, said fastening means attached to said support member;

a link member, said link member extending along said support member, said link member exteriorly positioned of said support member;

a handle, said handle mounted in said first opening of said support member, said handle defining a recess;

a first means for pivotally connecting said link member to said handle, said first connecting means mounted in said second opening; and a second means pivotally connecting said link member to the valve stem, wherein said handle manually moves said link member thereby moving the gate between open and closed positions.

2. An actuator as defined in claim 1 wherein said recess receives a lever, said lever for applying greater force to said handle when opening and closing the gate.

3. An actuator as defined in claim 2 wherein said lever is a tire iron.

4. An actuator as defined in claim 1, in which said support member, said handle and said link member are made of plastic.

5. An actuator as defined in claim 1 wherein said handle defines a plurality of connection points.

6. An actuator as defined in claim 5 wherein each of said plurality of connection points is threaded.

7. An actuator as defined in claim 1 wherein said first means for pivotally connecting said link member to said handle comprises an axle, said axle pivoting relative to said handle.

8. An actuator as defined in claim 7 wherein said first connecting means further comprises a washer and a fastener.

9. An actuator as defined in claim 1 wherein said means for fastening said support member to the gate valve housing comprises an elongate hole.

10. An actuator as defined in claim 1 wherein said second opening is an arcuate slot, and said handle moves said first connecting means therealong.

11. An external actuator for manually operating a gate valve, the gate valve having a housing and a linearly sliding gate in the housing, said gate movable between open and closed positions, and an elongated valve stem attached to the gate valve to slide in a reciprocal path of motion along the longitudinal axis of the valve stem, the actuator comprising:

a support member, said support member extending along and spaced from the valve stem;

means for fastening the support member to the gate valve housing, wherein said fastening means is attached to said support member;

an elongated link member, said elongated link member supported adjacent and parallel to said support member;

a handle, said handle mounted on said support member, said handle defining a plurality of connection points;

a first means pivotally connecting said link member and said handle, said first connecting means mounted in one of said plurality of connection points; and a second means pivotally connecting said link member and said valve stem.

12. The actuator of claim 11 wherein said handle is rotatable about an axis perpendicular to said support member.

13. The actuator of claim 11 wherein said support means defines an arcuate slot.

14. The actuator of claim 11 wherein said handle defines a recess.

15. The actuator of claim 14 wherein said recess is square.

16. The actuator of claim 11 wherein said handle comprises a circular plate and a plurality of fingers, said fingers radially disposed on said circular plate, each of said connection points proximate different ones of said plurality of fingers.

* * * * *